United States Patent
Govindaraju et al.

(10) Patent No.: US 11,848,833 B1
(45) Date of Patent: Dec. 19, 2023

(54) SYSTEM AND METHOD FOR OPERATIONAL INTELLIGENCE BASED ON NETWORK TRAFFIC

(71) Applicant: VMware, Inc., Palo Alto, CA (US)

(72) Inventors: Agila Govindaraju, Bangalore (IN); Rutuja Ganesh Dhamale, Maharashtra (IN)

(73) Assignee: VMWARE, INC., Palo Alto, CA (US)

( * ) Notice: Subject to any disclaimer, the term of this patent is extended or adjusted under 35 U.S.C. 154(b) by 0 days.

(21) Appl. No.: 17/977,732

(22) Filed: Oct. 31, 2022

(51) Int. Cl.
*G06F 15/173* (2006.01)
*H04L 43/02* (2022.01)
*H04L 43/04* (2022.01)
*H04L 41/40* (2022.01)

(52) U.S. Cl.
CPC .............. *H04L 43/02* (2013.01); *H04L 41/40* (2022.05); *H04L 43/04* (2013.01)

(58) Field of Classification Search
CPC .......... H04L 43/02; H04L 43/04; H04L 41/40
USPC ......................................................... 709/224
See application file for complete search history.

(56) References Cited

U.S. PATENT DOCUMENTS

| | | | |
|---|---|---|---|
| 9,813,432 B2 | 11/2017 | Dasgupta et al. | |
| 10,264,020 B1* | 4/2019 | Nanda | H04L 43/04 |
| 10,536,355 B1* | 1/2020 | Cao | H04L 43/20 |
| 11,641,305 B2* | 5/2023 | Myneni | H04L 45/28 |
| | | | 709/224 |
| 2014/0172852 A1* | 6/2014 | Kay | H04L 41/142 |
| | | | 707/736 |
| 2017/0126506 A1* | 5/2017 | Padala | H04L 41/046 |
| 2019/0058649 A1* | 2/2019 | Qi | H04L 43/065 |
| 2020/0220796 A1* | 7/2020 | Tao | H04L 43/20 |
| 2020/0267071 A1* | 8/2020 | Ghag | G06F 11/301 |

FOREIGN PATENT DOCUMENTS

WO    WO-2015130643 A1 * 9/2015 ............. G06Q 10/06

* cited by examiner

*Primary Examiner* — Hee Soo Kim
(74) *Attorney, Agent, or Firm* — LOZA & LOZA, LLP (57) ABSTRACT

System and computer-implemented method for analyzing software-defined data center (SDDC) components in a computing environment uses network traffic data, which is correlated with an inventory of SDDC components in the computing environment to calculate a metric collection parameter for each SDDC component in the computing environment based on data flow associated with that SDDC component. Relevant metrics from each of the SDDC components in the computing environment are collected according to the metric collection parameter for that SDDC component to analyze the SDDC components.

20 Claims, 10 Drawing Sheets

SYSTEM AND METHOD FOR OPERATIONAL INTELLIGENCE BASED ON NETWORK TRAFFIC

BACKGROUND

Software-defined data center (SDDC) is an architectural approach based on virtualization and automation, which drives many of current leading data centers. In an SDDC, the infrastructure is virtualized, and the control of the SDDC is entirely automated by software. Since SDDCs currently run major workloads around the world, it is very important to take care of the health of the various SDDC components, such as compute, network, storage components, which form the SDDCs.

SDDC users may have thousands of workloads running on multiple SDDC components in one or more SDDCs. Out of these workloads, only part of them are critical in nature. However, all the SDDC components need to be monitored to provide highly available infrastructure to the users. To achieve this, multitude of metrics across these different components are collected so that the health of the components can be measured correctly. These collected metrics may be fed into monitoring tools, such as Wavefront™ by VMware and Prometheus, to visualize and analyze the health of the components. The SDDC users are typically charged by the monitoring tools based on the points (metrics) that are ingested per second or points per second (PPS). Thus, as more and more metrics are ingested to analyze the health of SDDC components, the cost of the monitoring tool to the SDDC user is correspondingly increased. Thus, there is a need to reduce the PPS without compromising on the health monitoring of the SDDC components on which critical workloads are running.

SUMMARY

System and computer-implemented method for analyzing software-defined data center (SDDC) components in a computing environment uses network traffic data, which is correlated with an inventory of SDDC components in the computing environment to calculate a metric collection parameter for each SDDC component in the computing environment based on data flow associated with that SDDC component. Relevant metrics from each of the SDDC components in the computing environment are collected according to the metric collection parameter for that SDDC component to analyze the SDDC components.

A computer-implemented method for analyzing software-defined data center (SDDC) components in a computing environment in accordance with an embodiment of the invention comprises monitoring network traffic in the computing environment to produce network traffic data, correlating the network traffic data for the computing environment with an inventory of SDDC components in the computing environment to calculate a metric collection parameter for each SDDC component in the computing environment based on data flow associated with that SDDC component, wherein an amount of metrics collected for each SDDC component is dependent on a corresponding metric collection parameter for that SDDC component, collecting relevant metrics from each of the SDDC components in the computing environment according to the metric collection parameter for that SDDC component, and analyzing the SDDC components in the computing environment using the relevant metrics for the SDDC components. In some embodiments, the steps of this method are performed when program instructions contained in a computer-readable storage medium are executed by one or more processors.

A system in accordance with an embodiment of the invention comprises memory and at least one processor configured to monitor network traffic in the computing environment to produce network traffic data, correlate the network traffic data for the computing environment with an inventory of SDDC components in the computing environment to calculate a metric collection parameter for each SDDC component in the computing environment based on data flow associated with that SDDC component, wherein an amount of metrics collected for each SDDC component is dependent on a corresponding metric collection parameter for that SDDC component, collect relevant metrics from each of the SDDC components in the computing environment according to the metric collection parameter for that SDDC component, and analyze the SDDC components in the computing environment using the relevant metrics for the SDDC components.

Other aspects and advantages of embodiments of the present invention will become apparent from the following detailed description, taken in conjunction with the accompanying drawings, illustrated by way of example of the principles of the invention.

BRIEF DESCRIPTION OF THE DRAWINGS

Throughout the description, similar reference numbers may be used to identify similar elements.

DETAILED DESCRIPTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

Figure 1:
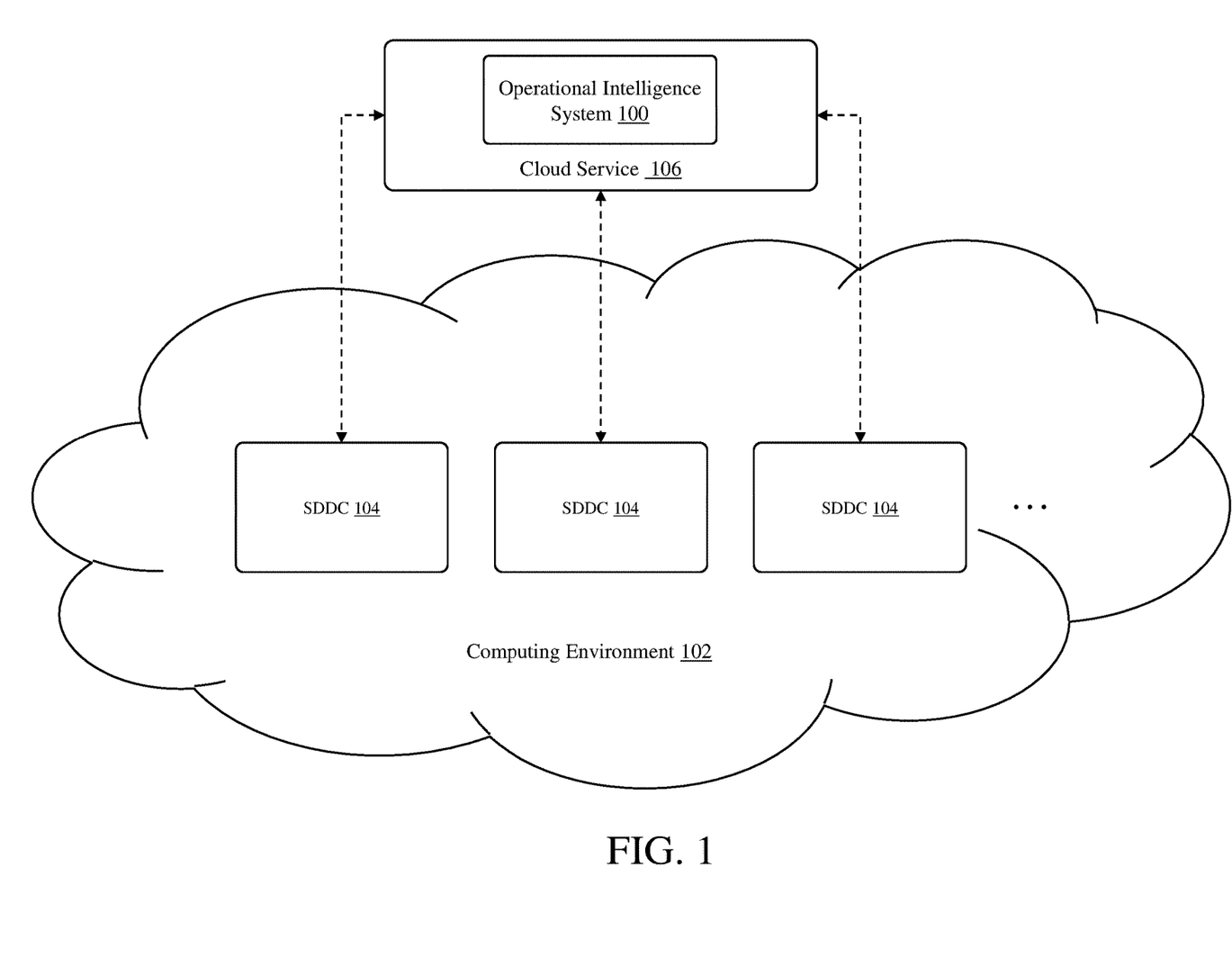
FIG. 1 illustrates an operational intelligence system in accordance with an embodiment of the invention.

Turning now to FIG. 1, an operational intelligence (OI) system 100 in accordance with an embodiment of the invention is illustrated. As described in more detail below, the OI system 100 efficiently collects operational metrics (sometimes referred to herein as simply "metrics") from a computing environment 102, which includes one or more software-defined data centers (SDDCs) 104, based on network traffic pattern so that the collected metrics can be used to analyze and visualize the health of various SDDC components in the computing environment. These SDDC components are any entities that can receive, process and/or transmit data, such as host computers, virtual machines, containers and container clusters.

The computing environment 102 can be any type of a computing environment in which software processes can run, such as an on-premises private cloud, a public cloud or a multi-cloud environment, e.g., a hybrid cloud. In an embodiment, some of the SDDCs 104 deployed in the computing environment 102 may be offered by a cloud service provider as managed SDDCs. These managed SDDCs may be supported and managed by a cloud service 106, which includes various management and monitoring components to ensure that the managed SDDCs are running properly. In the illustrated embodiment, the OI system 100 may be part of the cloud service 106.

Figure 2:
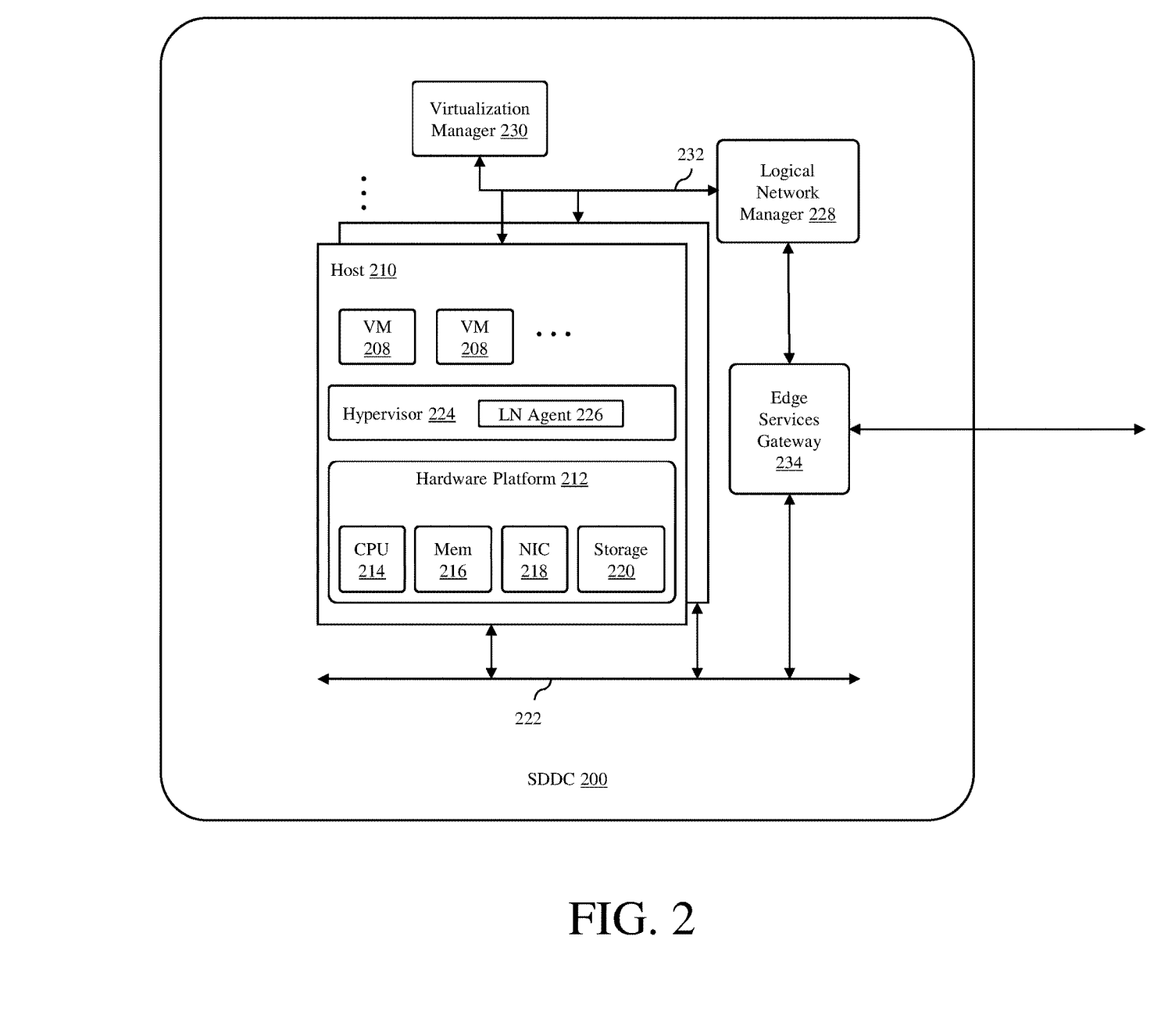
FIG. 2 is a diagram of a software-defined data center (SDDC) that can be deployed in a computing environment in accordance with an embodiment of the invention.

Turning now to FIG. 2, a representative SDDC 200 that can be deployed in the computing environment 102 in accordance with an embodiment of the invention is illustrated. Thus, the SDDC 200 is an example of the SDDCs 104 depicted in FIG. 1.

As shown in FIG. 2, the SDDC 200 includes one or more host computer systems ("hosts") 210. The hosts may be constructed on a server grade hardware platform 212, such as an x86 architecture platform. As shown, the hardware platform of each host may include conventional components of a computing device, such as one or more processors (e.g., CPUs) 214, system memory 216, a network interface 218, and storage 220. The processor 214 can be any type of a processor commonly used in servers. The memory 216 is volatile memory used for retrieving programs and processing data. The memory 216 may include, for example, one or more random access memory (RAM) modules. The network interface 218 enables the host 210 to communicate with other devices that are inside or outside of the SDDC 200 via a communication medium, such as a network 222. The network interface 218 may be one or more network adapters, also referred to as network interface cards (NICs). The storage 220 represents one or more local storage devices (e.g., one or more hard disks, flash memory modules, solid state disks and/or optical disks), which may be used to form a virtual storage area network (SAN).

Each host 210 may be configured to provide a virtualization layer that abstracts processor, memory, storage and networking resources of the hardware platform 212 into virtual computing instances, e.g., virtual machines 208, that run concurrently on the same host. The virtual machines run on top of a software interface layer, which is referred to herein as a hypervisor 224, that enables sharing of the hardware resources of the host by the virtual machines. One example of the hypervisor 224 that may be used in an embodiment described herein is a VMware ESXi™ hypervisor provided as part of the VMware vSphere® solution made commercially available from VMware, Inc. The hypervisor 224 may run on top of the operating system of the host or directly on hardware components of the host. For other types of virtual computing instances, the host may include other virtualization software platforms to support those virtual computing instances, such as Docker virtualization platform to support "containers." In the following description, the virtual computing instances 208 will be described as being virtual machines.

In the illustrated embodiment, the hypervisor 224 includes a logical network (LN) agent 226, which operates to provide logical networking capabilities, also referred to as "software-defined networking" (SDN). Each logical network may include software managed and implemented network services, such as bridging, L3 routing, L2 switching, network address translation (NAT), and firewall capabilities, to support one or more logical overlay networks in the SDDC 200. The logical network agent 226 receives configuration information from a logical network manager 228 (which may include a control plane cluster) and, based on this information, populates forwarding, firewall and/or other action tables for dropping or directing packets between the virtual machines 208 in the host 210, other virtual machines on other hosts, and/or other devices outside of the SDDC 200. Collectively, the logical network agent 226, together with other logical network agents on other hosts, according to their forwarding/routing tables, implement isolated overlay networks that can connect arbitrarily selected virtual machines with each other. Each virtual machine may be arbitrarily assigned a particular logical network in a manner that decouples the overlay network topology from the underlying physical network. Generally, this is achieved by encapsulating packets at a source host and decapsulating packets at a destination host so that virtual machines on the source and destination can communicate without regard to underlying physical network topology. In a particular implementation, the logical network agent 226 may include a Virtual Extensible Local Area Network (VXLAN) Tunnel End Point or VTEP that operates to execute operations with respect to encapsulation and decapsulation of packets to support a VXLAN backed overlay network. In alternate implementations, VTEPs support other tunneling protocols such as stateless transport tunneling (STT), Network Virtualization using Generic Routing Encapsulation (NVGRE), or Geneve, instead of, or in addition to, VXLAN.

The SDDC 200 also includes a virtualization manager 230 that communicates with the hosts 210 via a management network 232. In an embodiment, the virtualization manager 230 is a computer program that resides and executes in a computer system, such as one of the hosts, or in a virtual computing instance, such as one of the virtual machines 208 running on the hosts. One example of the virtualization manager 230 is the VMware vCenter Server® product made available from VMware, Inc. In an embodiment, the virtualization manager is configured to carry out administrative tasks for a cluster of hosts that forms an SDDC, including managing the hosts in the cluster, managing the virtual machines running within each host in the cluster, provisioning virtual machines, migrating virtual machines from one host to another host, and load balancing between the hosts in the cluster.

As noted above, the SDDC 200 also includes the logical network manager 228 (which may include a control plane cluster), which operates with the logical network agents 226 in the hosts 210 to manage and control logical overlay networks in the SDDC 200. Logical overlay networks comprise logical network devices and connections that are mapped to physical networking resources, e.g., switches and routers, in a manner analogous to the manner in which other physical resources as compute and storage are virtualized. In an embodiment, the logical network manager 228 has access to information regarding physical components and logical overlay network components in the SDDC. With the physical and logical overlay network information, the logical network manager 228 is able to map logical network configurations to the physical network components that convey, route, and filter physical traffic in the SDDC 200. In one particular implementation, the logical network manager 228 is a VMware NSX® product running on any computer, such as one of the hosts or a virtual machine in the SDDC 200.

The SDDC 200 also includes a gateway 234 to control network traffic into and out of the SDDC 200. In an embodiment, the gateway 234 may be implemented in one of the virtual machines 208 running in the SDDC 200. In a particular implementation, the gateway 234 may be an edge services gateway. One example of the edge services gateway 234 is VMware NSX® Edge™ product made available from VMware, Inc.

Turning back to FIG. 1, the OI system 100 operates to monitor the network traffic across the SDDCs 104 in the computing environment 102 from and to various SDDC components to collect network traffic data. Using the current inventory of SDDC components in the computing environment, the collected network traffic data is correlated with the SDDC components to determine the data flow into and out of each of the SDDC components. Depending on the data flow of each SDDC component, which indicates whether the SDDC component can be considered to be critical or not, one or more parameters of operational metric collection for that SDDC component are defined so that less operational metrics are collected for noncritical SDDC components and/or more detailed operational metrics are collected for critical SDDC components. The metric collection parameters may include the collection frequency and/or the granularity of operational metrics to be collected for a particular SDDC component.

The collected operational metrics for the SDDC components can then be used for analysis of the SDDC components, including health analysis of the SDDC components. Since less operational metrics are collected for the SDDC components associated with low data flow, i.e., noncritical SDDC components, the overall amount of collected operational metrics used for the analysis of the SDDC components can be reduced without reducing the amount of operational metrics collected for the SDDC components with high data flow, i.e., the critical SDDC components, which are necessary to properly determine the health of these critical SDDC components.

Figure 3:
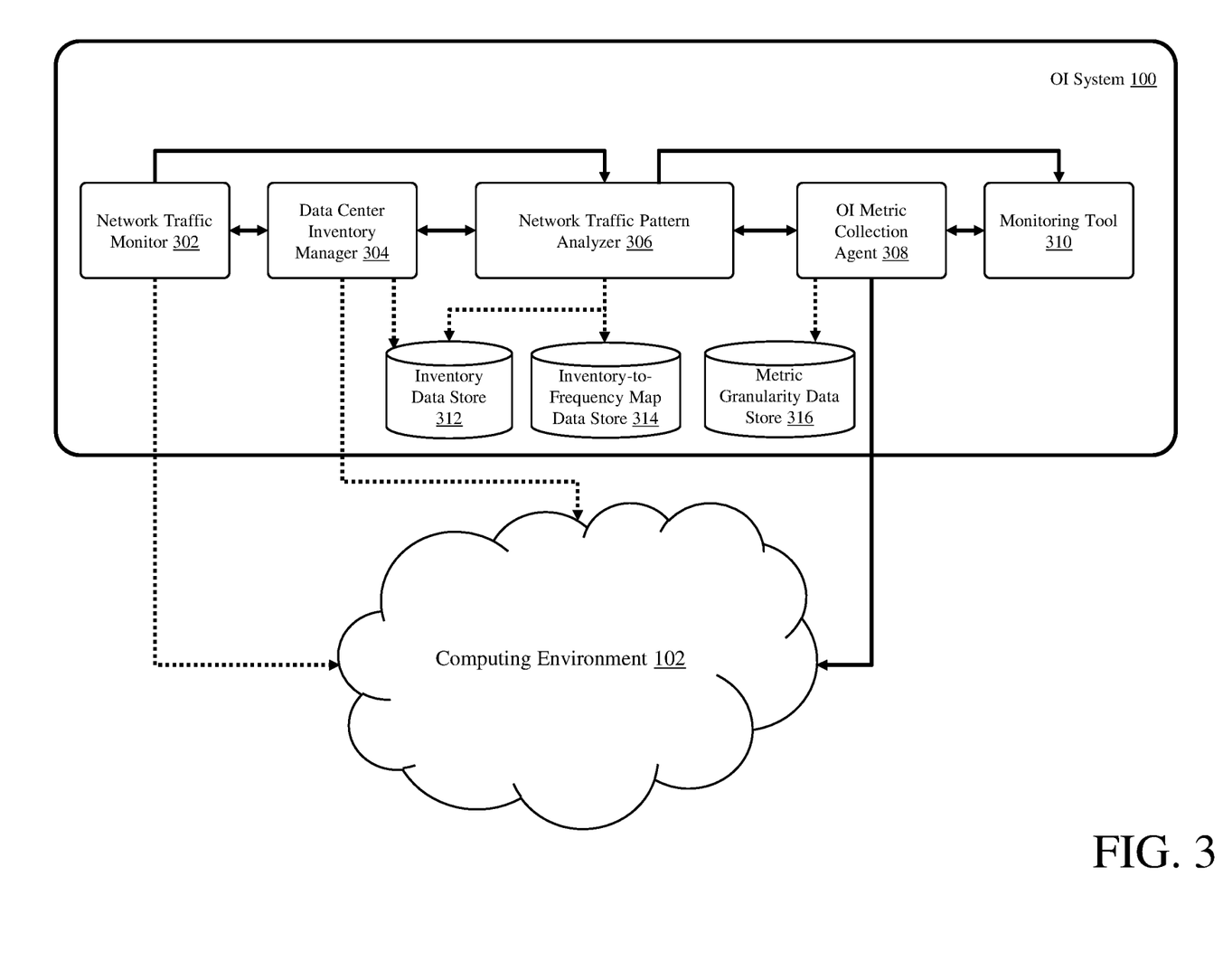
FIG. 3 shows the components of the operational intelligence system in accordance with an embodiment of the invention.

In FIG. 3, the components of the OI system 100 in accordance with an embodiment of the invention are shown. The OI system includes a network traffic monitor 302, a data center inventory manager 304, a network traffic pattern analyzer 306, an OI metric collection agent 308 and a monitoring tool 310. These components perform various tasks to collect operational metrics of the SDDC components in the computing system for operational intelligence.

The network traffic monitor 302 of the OI system 100 operates to monitor the flow of network data between various SDDC components in the computing environment 102 to generate network traffic data. The network traffic data includes flow of data transmitted into and from each of the SDDC components. As an example, the network traffic monitor may be a conventional network traffic monitor, such as VMware vRealize® Network Insight™ (vRNI), Cisco Nexus, Arista or Pluribus monitoring tool.

The data center inventory manager 304 of the OI system 100 operates to maintain the current inventory information of the SDDC components across the various SDDCs 104 in the computing environment 102. The data center inventory manager may retrieve the inventory information from one or more management components in each of the SDDCs, such as the virtualization manager 230 in the SDDC 200. In an embodiment, this inventory information may be stored in an inventory data store 312.

The network traffic pattern analyzer 306 of the OI system 100 operates to analyze the network traffic data from the network traffic monitor 302 using the inventory information from the inventory data store 312 to determine the network traffic pattern across the SDDC components in the computing environment 102. In particular, upon receiving the network traffic details from the network traffic monitor 302, the network traffic data is correlated with the inventory details of the SDDCs to determine the data flow into and out of each of the SDDC components. This data flow for each of the SDDC components is used to calculate one or more parameters of metric collection for that SDDC component. Thus, the metric collection parameters of one SDDC component may be different from the metric collection parameters of another SDDC component.

In an embodiment, a metric collection parameter calculated for each of the SDDC components is the frequency of metric collection for that SDDC component based on the data flow of that SDDC component. For example, if the ingress and/or egress data flow of a particular host computer in the computing environment is heavy, which indicates that the host computer is important or critical, then the metric collection for that host computer can be tuned to as low as one (1) second interval, i.e., the metrics from the host computer are collected every one (1) second. However, if the ingress and/or egress data flow of the host computer is low, then the metric collection for that host computer can be increased to sixty (60) seconds, for example, as the host computer is less important component, which does not heavily participate in the workloads. These frequencies of metric collection for the different SDDC components in the computing environment 102 may be mapped to the corresponding SDDC components in an inventory-to-frequency map, which lists the SDDC components and their calculated frequencies of metric collection. The inventory-to-frequency map may be stored in an inventory-to-frequency data store 314.

In an embodiment, the determination of whether an SDDC component should be assigned a low or high metric collection frequency is determined using a threshold, where if the ingress and/or egress data flow is below the threshold, the SDDC component is assigned a low metric collection frequency, and if the ingress and/or egress data flow is above the threshold, the SDDC component is assigned a high metric collection frequency. As an example, if the number of transmitted and received data bytes per minute for an SDDC component is less than 50 kilobytes or any other threshold, the SDDC component is assigned a low metric collection frequency. Otherwise, the SDDC component is assigned a low metric collection frequency. In some embodiments, the threshold of number of bytes for determining low or high metric collection frequency for an SDDC component may be adjusted based on the applications deployed in an SDDC in which the SDDC component resides.

In an embodiment, another metric collection parameter calculated for each of the SDDC components is the granularity of metrics to be collected for each of the SDDC components based on the data flow of that SDDC component. Since the metric collection frequency is dependent on the data flow of each of the SDDC component, the granularity of metrics to be collected for each of the SDDC components may be based on the calculated metric collection frequency of that SDDC component. If the frequency of metric collection is low, then only the top-level metrics may be collected since an SDDC component assigned a low metric collection frequency is assumed to be not running critical workloads. However, if the frequency of metric collection is high, then deeper level metrics may also be collected since an SDDC component assigned a high metric collection frequency is assumed to be running critical workloads. The top-level metrics are broad general metrics of the SDDC components, such as host health status and amount of resources used. Deeper level metrics are more specific or detailed metrics of the SDDC components. Thus, granularity of the metrics to be collected for each of the SDDC components of the computing environment can be specified The information regarding the granularity of the metrics to be collected for each SDDC component based on its metric collection frequency may be stored in a metric granularity data store.

Figure 4A:
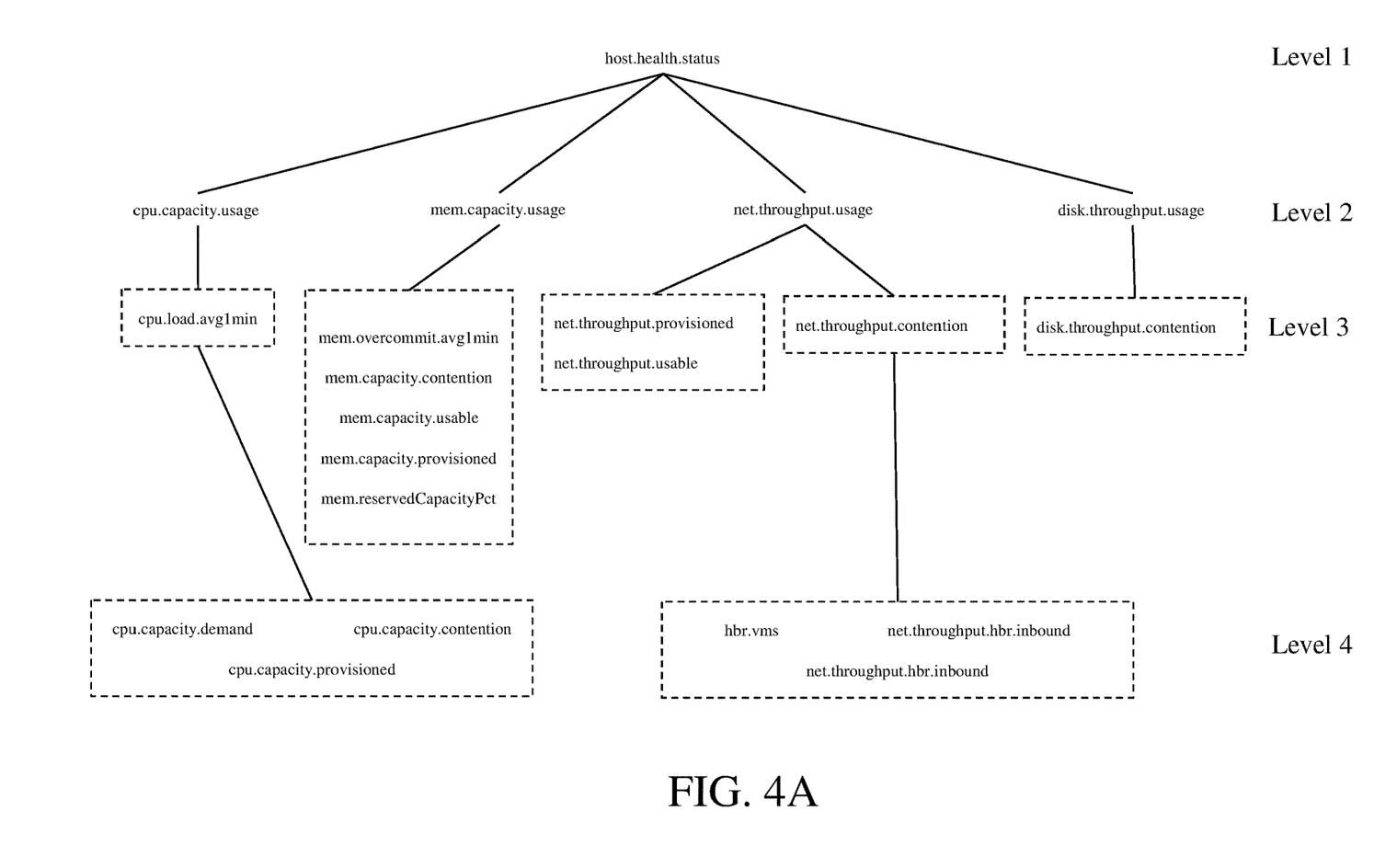
FIGS. 4A-4C illustrate operational metrics in different levels for a host, a Go runtime and a java virtual machine runtime in accordance with an embodiment of the invention.
Figure 4B:
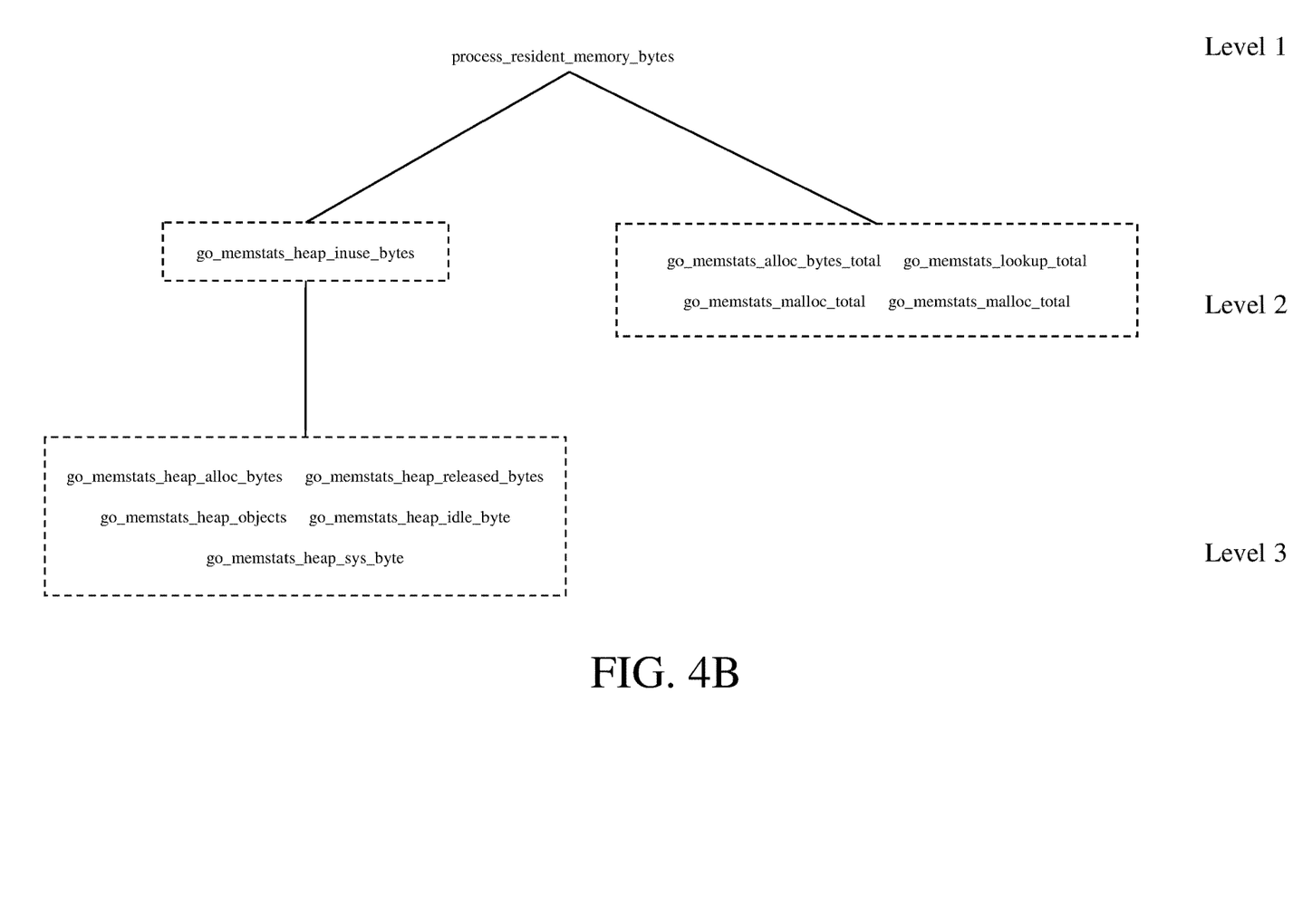
Figure 4C:
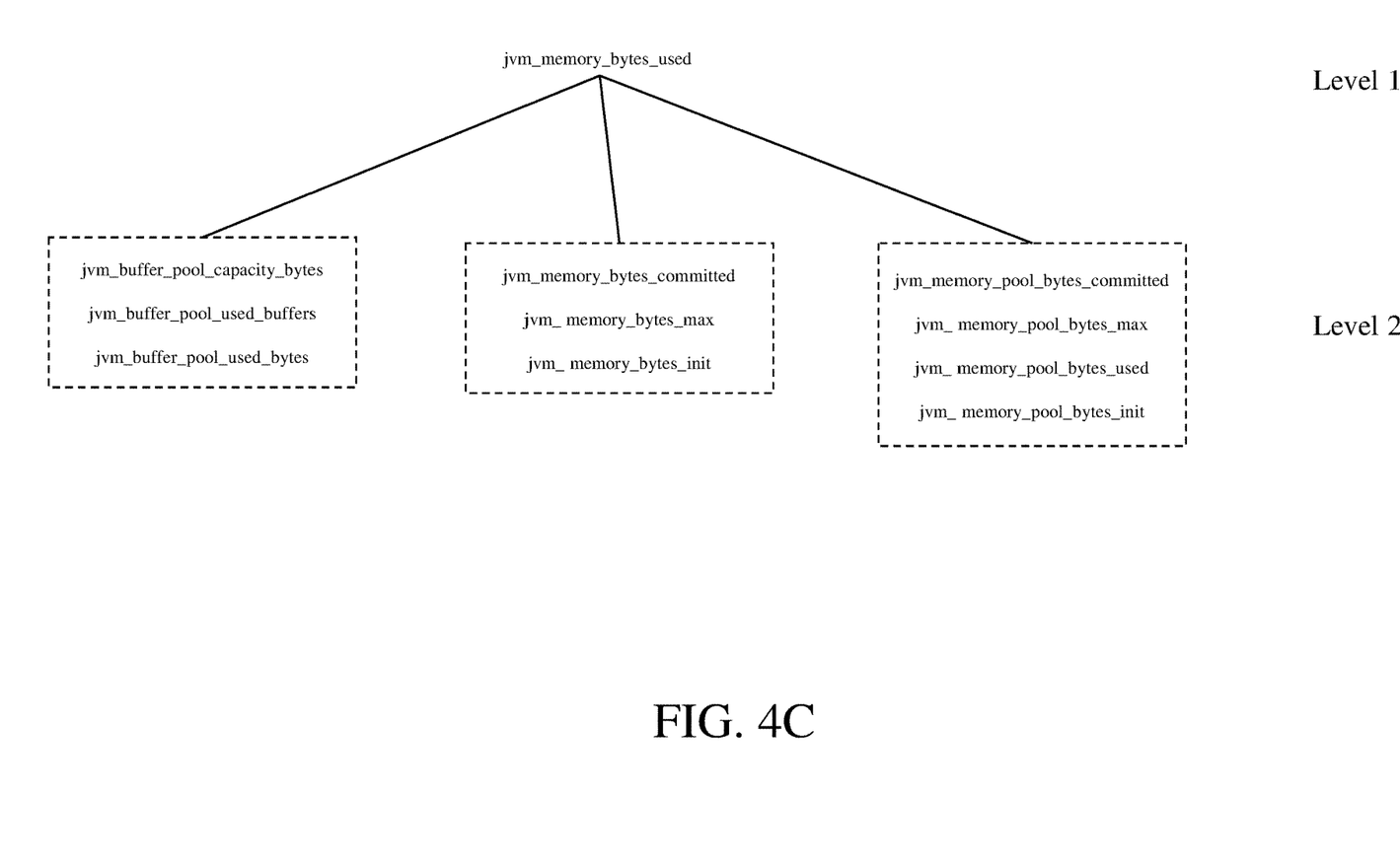

Examples of different levels of metrics to be collected are illustrated in FIGS. 4A-4C. FIG. 4A shows four (4) levels of metrics for a host computer. As shown in FIG. 4A, level 1 includes one operational metric: host health status. Level 2 includes four (4) operational metrics: CPU capacity usage, memory capacity usage, network throughput usage, and disk throughput usage. Level 3 includes ten (10) operational metrics: CPU load average for 1 minute, memory overcommit average for 1 minute, memory capacity contention, usable memory capacity, provisioned memory capacity, reserved memory capacity in percentage, provisioned network throughput, usable network throughput, network throughput contention and disk throughput contention. Level 4 includes six (6) operational metrics: CPU capacity demand, CPU capacity contention, provisioned CPU capacity, host-based replication virtual machines (hbr.vms), network throughput hbr inbound, and network throughput hbr outbound.

FIG. 4B shows three (3) levels of metrics for a Go runtime. As shown in FIG. 4B, level 1 includes one operational metric: process resident memory bytes. Level 2 includes five (5) operational metrics: Go memstats heap inuse bytes, total Go memstat allocation bytes, total Go memstats lookups, total Go memstats mallocs, and total Go memstats mallocs. Level 3 includes five (5) operational metrics: Go memstas heap allocation bytes, Go memstats heap released bytes, Go memstats heap objects, go memstats heap idle bytes, and go memstats heap sys bytes.

FIG. 4C shows two (2) levels of metrics for a java virtual machine runtime. As shown in FIG. 4C, level 1 includes one operational metric: java virtual machine memory bytes used. Level 2 includes ten (10) operational metrics: java virtual machine buffer pool capacity bytes, java virtual machine buffer pool used buffers, java virtual machine buffer pool used bytes, java virtual machine memory bytes committed, maximum java virtual machine memory bytes, java virtual machine memory pool bytes used, and initial java virtual machine memory pool bytes.

Thus, for a SDDC component with a low frequency of metric collection, i.e., noncritical SDDC component, only metrics in level 1 may be collected. For a SDDC component with a high frequency of metric collection, i.e., critical SDDC component, additional metrics in lower levels, such as levels 2-4, may be collected.

Turning back to FIG. 3, the OI metric collection agent 308 of the OI system 100 operates to collect the operational metrics from each of the SDDC components based on the metric collection parameters for that SDDC component, such as the collection frequency and/or metrics granularity. The inventory-to-frequency map, which is received from the network traffic pattern analyzer 306, is used by the OI metric collection agent to determine the metric collection frequency for each of the SDDC components in the computing environment 102. The metric granularity information for each of the SDDC components in the computing environment is used to determine the granularity of the metrics to be collected for each of the SDDC components in the computing environment. Using the frequency and metric granularity information, the relevant metrics are collected for the SDDC components in the computing environment. With this dynamic resizing of collection intervals and granularities of collected metrics for the various SDDC components, the amount of metrics collected for all the SDDC components can be significantly reduced, which can lower the cost of processing the collected metrics without compromising the amount of metrics collected for the critical SDDC components.

Figure 5A:
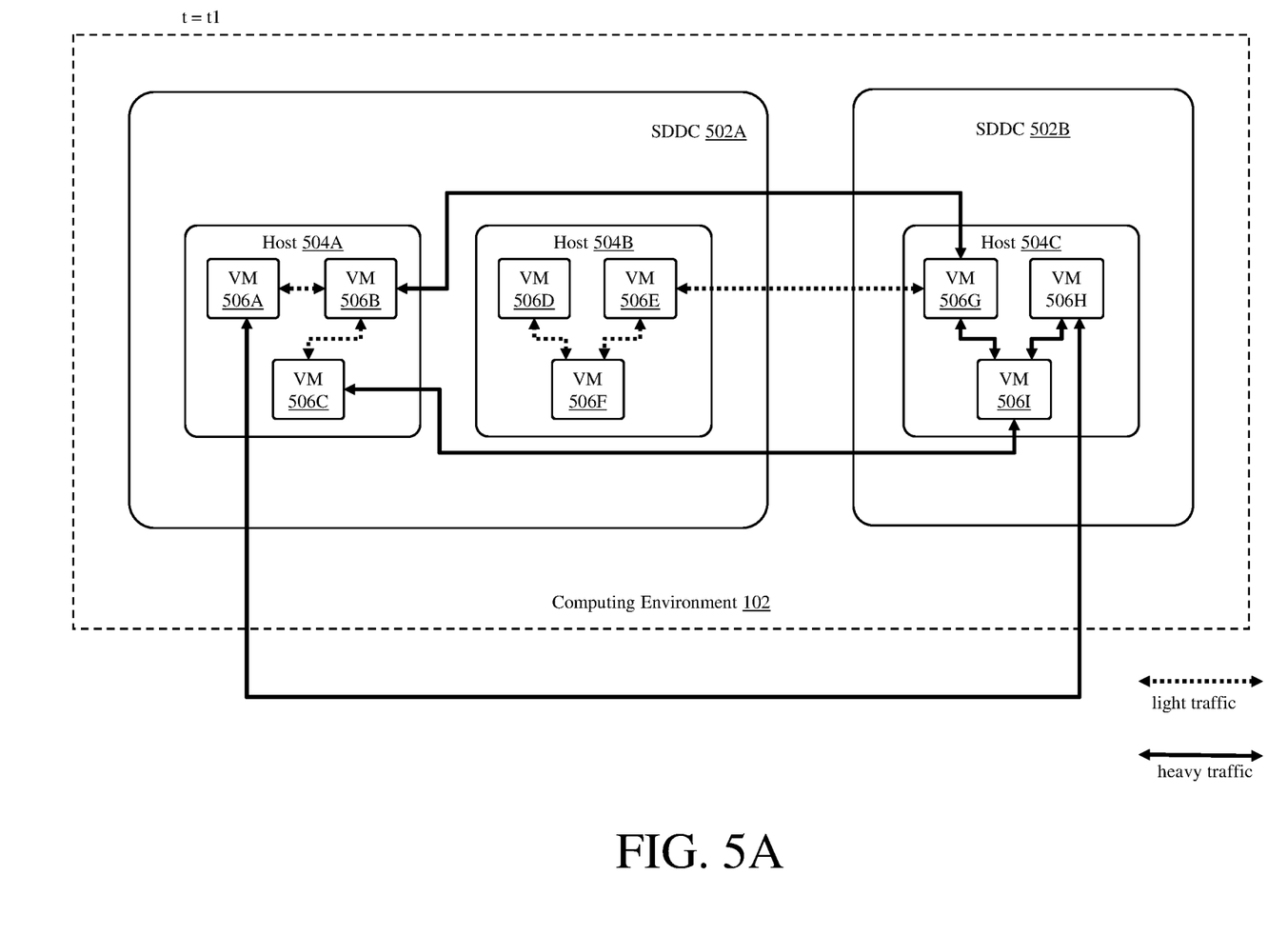
FIGS. 5A and 5B illustrate examples of network traffic in the computing environment in accordance with an embodiment of the invention.
Figure 5B:
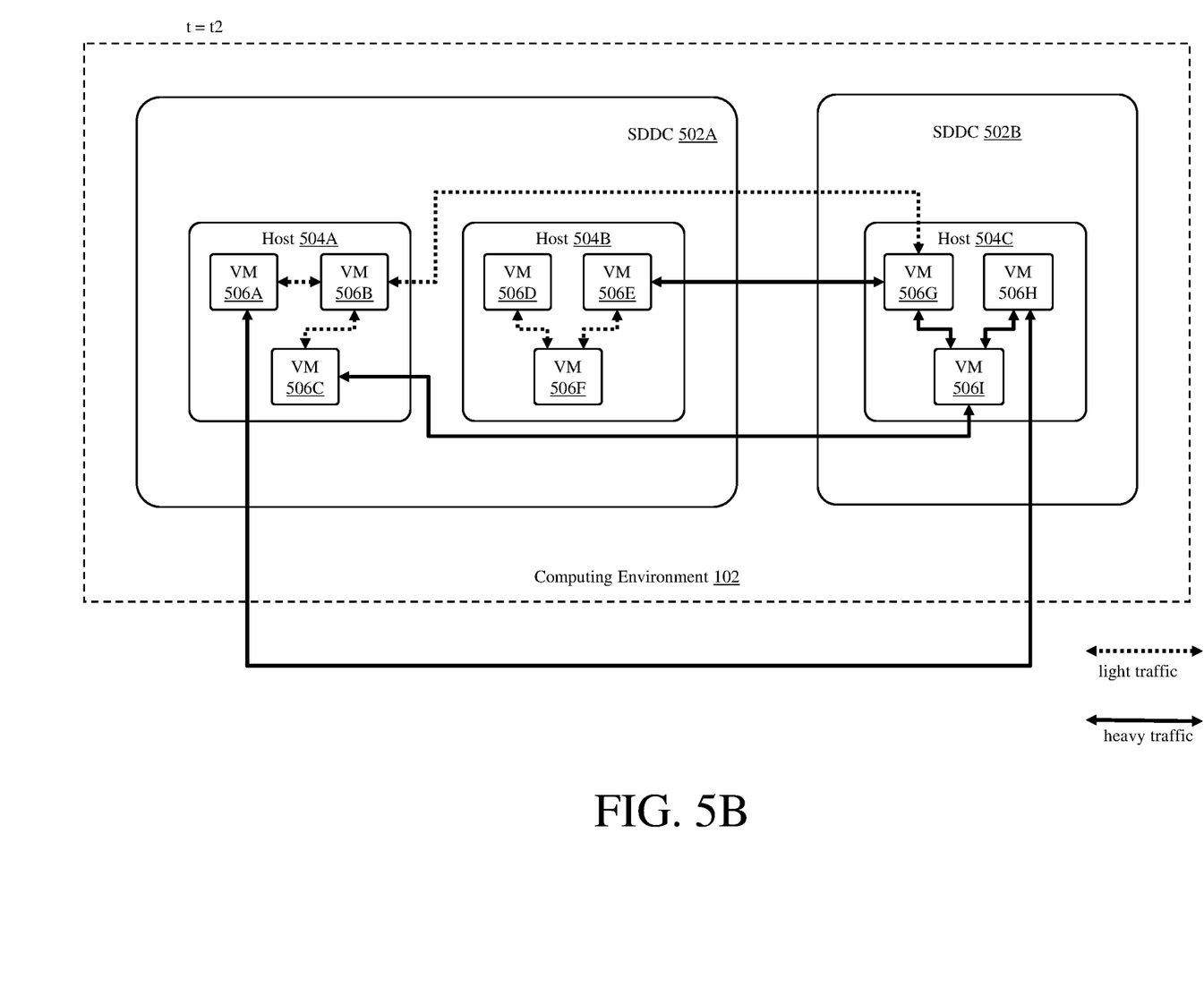

The dynamic resizing of collection intervals and granularities of metrics to be collected for the various SDDC components is illustrated using an example shown in FIGS. 5A and 5B. In this illustrated example, the computing environment 102 includes an SDDC 502A with two hosts 504A and 504B, and an SDDC 502A with one host 504C. The host 504A includes virtual machines 506A, 506B and 506C, the host 504B includes virtual machines 506D, 506E and 506F, and the host 504C includes virtual machines 506G, 506H and 506I. FIG. 5A shows heavy network traffic and light network traffic between the virtual machines in the different hosts at time t1. Thus, for the computing environment shown in FIG. 5A, the network traffic monitor 302 will report heavy ingress/egress network flow for the virtual machines 506A, 506B and 506C running on the host 504A in the SDDC 502A and for the virtual machines 506G, 506H and 506I on the host 504C in the SDCC 502B and light ingress/egress network flow for the virtual machines 506E, 506F and 506G running on the host 504B in the SDDC 502A. This information is received by the OI metric collection agent 308 through the network traffic pattern analyzer 306. Thus, more frequent and more (or finer) granular metric collection is enabled for the virtual machines running on the hosts 504A and 504C in the SDDCs 502A and 502B, while less frequent and less (or more coarse) granular metric collection is enabled for the virtual machines running on the host 504B in the SDDC 502A.

FIG. 5B illustrates the network traffic in the computing environment 102 at time t2. FIG. 5B shows that heavy network traffic and light network traffic between the virtual machines 506A-506I in the different hosts 504A-504C have changed since time t1. Thus, for the computing environment shown in FIG. 5B, the network traffic monitor will report low ingress/egress network flow for the virtual machine 506B running on the host 504A in the SDDC 502A and heavy ingress/egress network flow for the virtual machine 506E running on the host 504B in the SDDC 502A, for example. This information is received by the OI metric collection agent 308 through the network traffic pattern analyzer 306. Thus, less frequent and less granular metric collection is enabled for the virtual machine 506B running on the host 504A in the SDDC 502A, while more frequent and more granular metric collection is enabled for the virtual machine 506E running on the host 504B in the SDDC 502A.

Turning back to FIG. 3, the metrics collected by the OI metric collection agent 308 and the network data flows collected by the network traffic pattern analyzer 306 are fed to a monitoring tool 310. The collected metrics and network data flows are processed by the monitoring tool 310 for analysis and visualization. In particular, the health of the SDDC components may be visually presented for users through a user interface. In an embodiment, the SDDC components may be grouped based on the network data flows or the network traffic pattern to provide contextual health view of the various SDDC components. For example, the SDDC components with heavy data flows may be grouped together and the SDDC components with light data flows may be grouped together. Thus, the monitoring tool 310 can provide a health overview of the SDDC components in the computing environment 102 for content driven health monitoring as the health of related SDDC components can be monitored together. In addition, the health overview with groupings can help to detect the root cause of a failure more easily.

Figure 6:
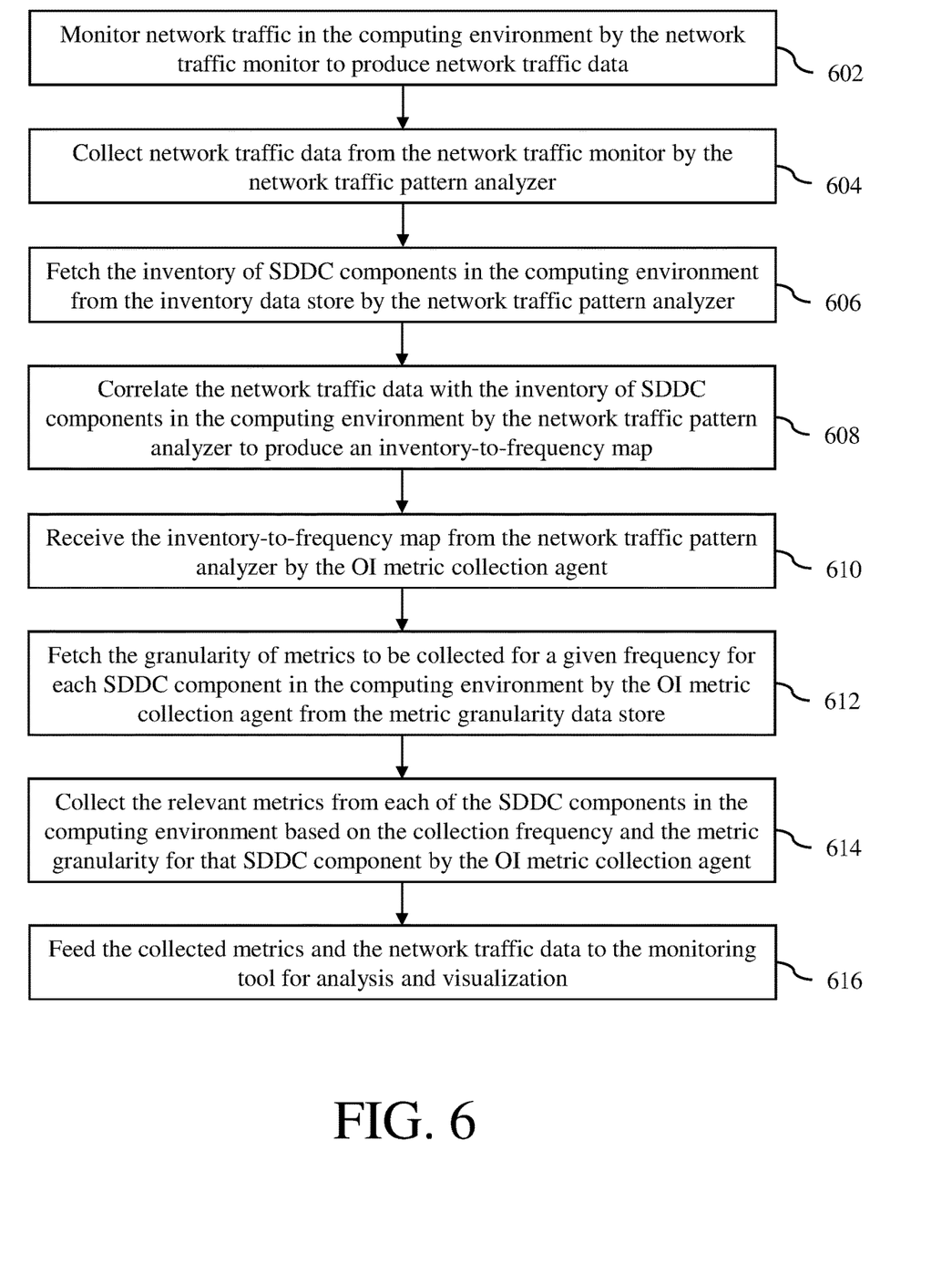
FIG. 6 is a process flow diagram of an operational intelligence operation in accordance with an embodiment of the invention.

The operational intelligence operation performed by the OI system 100 on the computing environment 102 in accordance with an embodiment of the invention is described with reference to a process flow diagram shown in FIG. 6. The operational intelligence operation may be executed periodically, for example, once an hour or any other time interval, to monitor and analyze the SDDC components, which may be running critical workloads.

The operational intelligence operation begins at step 602, where the network traffic in the computing environment 102 is monitored by the network traffic monitor 302. Next, at step 604, network traffic data from the network traffic monitor 302 is collected by the network traffic pattern analyzer 306. At step 606, the inventory of SDDC components in the computing environment 102 is fetched from the inventory data store 312 by the network traffic pattern analyzer 306.

Next, at step 608, the network traffic data is correlated with the inventory of SDDC components in the computing environment 102 by the network traffic pattern analyzer 306 to produce an inventory-to-frequency map, which can be stored in the inventory-to-frequency map data store 314.

Next, at step 610, the inventory-to-frequency map from the network traffic pattern analyzer 306 is received by the OI metric collection agent 308. Next, at step 612, the granularity of metrics to be collected for a given frequency for each SDDC component in the computing environment 102 is fetched by the OI metric collection agent 308 from the metric granularity data store 316, which contains information regarding the metrics to be collected from each component based on whether the data ingress and/or egress flow of the SDDC component is heavy or light.

Next at step 614, the relevant metrics are collected from each of the SDDC components in the computing environment 102 based on the collection frequency and the metric granularity for that SDDC component by the OI metric collection agent 308.

Next, step 616, the collected metrics and the network traffic data are fed to the monitoring tool 310 for analysis and visualization, including health analysis of the SDDC components. In an embodiment, the SDDC components may be grouped together based on the network data to provide contextual health view of the various SDDC components.

Figure 7:
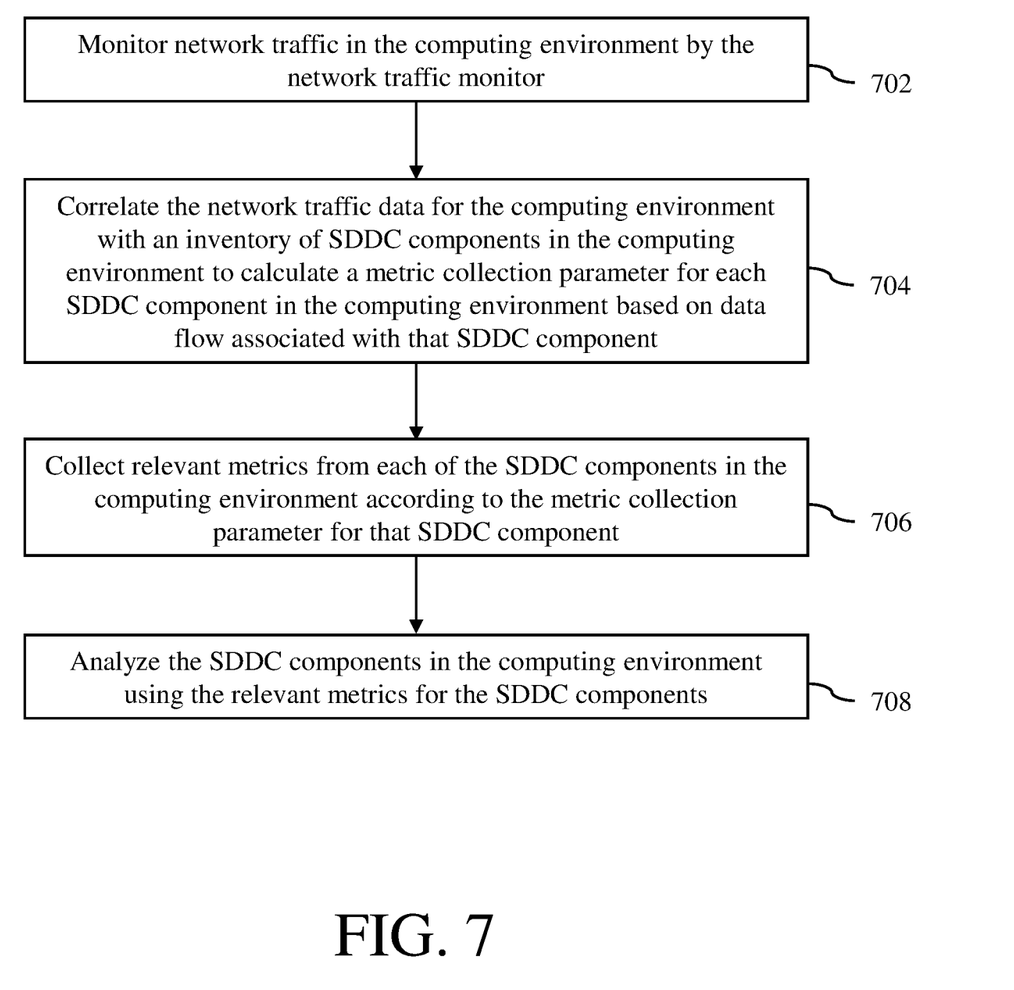
FIG. 7 is a flow diagram of a computer-implemented method for analyzing software-defined data center (SDDC) components in a computing environment in accordance with an embodiment of the invention.

A computer-implemented method for analyzing software-defined data center (SDDC) components in a computing environment in accordance with an embodiment of the invention is described with reference to a process flow diagram of FIG. 7. At block 702, network traffic in the computing environment is monitored to produce network traffic data. At block 704, the network traffic data for the computing environment is correlated with an inventory of SDDC components in the computing environment to calculate a metric collection parameter for each SDDC component in the computing environment based on data flow associated with that SDDC component. The amount of metrics collected for each SDDC component is dependent on a corresponding metric collection parameter for that SDDC component. At block 706, relevant metrics from each of the SDDC components in the computing environment are collected according to the metric collection parameter for that SDDC component. At block 708, the SDDC components in the computing environment are analyzed using the relevant metrics for the SDDC components.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods may be implemented using software instructions stored on a computer useable storage medium for execution by a computer. As an example, an embodiment of a computer program product includes a computer useable storage medium to store a computer readable program that, when executed on a computer, causes the computer to perform operations, as described herein.

Furthermore, embodiments of at least portions of the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The computer-useable or computer-readable medium can be an electronic, magnetic, optical, electromagnetic, infrared, or semiconductor system (or apparatus or device), or a propagation medium. Examples of a computer-readable medium include a semiconductor or solid state memory, magnetic tape, a removable computer diskette, a random access memory (RAM), a read-only memory (ROM), a rigid magnetic disc, and an optical disc. Current examples of optical discs include a compact disc with read only memory (CD-ROM), a compact disc with read/write (CD-R/W), a digital video disc (DVD), and a Blu-ray disc.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A computer-implemented method for analyzing software-defined data center (SDDC) components in a computing environment, the method comprising:
    monitoring network traffic in the computing environment to produce network traffic data;
    correlating the network traffic data for the computing environment with an inventory of SDDC components in the computing environment to calculate a metric collection parameter for each SDDC component in the computing environment based on data flow associated with that SDDC component, wherein an amount of metrics collected for each SDDC component is dependent on a corresponding metric collection parameter for that SDDC component;
    collecting relevant metrics from each of the SDDC components in the computing environment according to the metric collection parameter for that SDDC component; and
    analyzing the SDDC components in the computing environment using the relevant metrics for the SDDC components.

2. The computer-implemented method of claim 1, wherein correlating the network traffic data for the computing environment includes calculating a frequency of metric collection for each SDDC component in the computing environment based on the data flow associated with that SDDC component.

3. The computer-implemented method of claim 2, wherein calculating the frequency of metric collection includes calculating a first frequency of metric collection for a first SDDC component in the computing environment when the data flow associated with the first SDDC component exceeds a threshold and calculating a second frequency of metric collection for a second SDDC component in the computing environment when the data flow associated with the second SDDC component does not exceed the threshold, wherein the first frequency is higher frequency than the second frequency.

4. The computer-implemented method of claim 1, wherein correlating the network traffic data for the computing environment includes calculating a granularity of metrics to be collected for each SDDC component in the computing environment based on the data flow associated with that SDDC component.

5. The computer-implemented method of claim 4, wherein calculating the granularity of metrics to be collected includes calculating a first granularity of metrics to be collected for a first SDDC component in the computing environment when the data flow associated with the first SDDC component exceeds a threshold and a second granularity of metrics to be collected for a second SDDC component in the computing environment when the data flow associated with the second SDDC component does not exceed the threshold, wherein the first granularity of metrics to be collected includes deeper level of metrics than the second granularity of metrics to be collected.

6. The computer-implemented method of claim 1, further comprising grouping the SDDC components based on network traffic pattern to provide contextual health view of the SDDC components.

7. The computer-implemented method of claim 1, wherein the SDDC components include virtual machines, containers or container clusters.

8. The computer-implemented method of claim 1, wherein the metrics include CPU capacity usage, disk throughput usage and memory capacity usage.

9. A non-transitory computer-readable storage medium containing program instructions for analyzing software-defined data center (SDDC) components in a computing environment, wherein execution of the program instructions by one or more processors causes the one or more processors to perform steps comprising:
    monitoring network traffic in the computing environment to produce network traffic data;
    correlating the network traffic data for the computing environment with an inventory of SDDC components in the computing environment to calculate a metric collection parameter for each SDDC component in the computing environment based on data flow associated with that SDDC component, wherein an amount of metrics collected for each SDDC component is dependent on a corresponding metric collection parameter for that SDDC component;
    collecting relevant metrics from each of the SDDC components in the computing environment according to the metric collection parameter for that SDDC component; and
    analyzing the SDDC components in the computing environment using the relevant metrics for the SDDC components.

10. The non-transitory computer-readable storage medium of claim 9, wherein correlating the network traffic data for the computing environment includes calculating a frequency of metric collection for each SDDC component in the computing environment based on the data flow associated with that SDDC component.

11. The non-transitory computer-readable storage medium of claim 10, wherein calculating the frequency of metric collection includes calculating a first frequency of metric collection for a first SDDC component in the computing environment when the data flow associated with the first SDDC component exceeds a threshold and calculating a second frequency of metric collection for a second SDDC component in the computing environment when the data flow associated with the second SDDC component does not exceed the threshold, wherein the first frequency is higher frequency than the second frequency.

12. The non-transitory computer-readable storage medium of claim 9, wherein correlating the network traffic data for the computing environment includes calculating a granularity of metrics to be collected for each SDDC component in the computing environment based on the data flow associated with that SDDC component.

13. The non-transitory computer-readable storage medium of claim 12, wherein calculating the granularity of metrics to be collected includes calculating a first granularity of metrics to be collected for a first SDDC component in the computing environment when the data flow associated with the first SDDC component exceeds a threshold and a second granularity of metrics to be collected for a second SDDC component in the computing environment when the data flow associated with the second SDDC component does not exceed the threshold, wherein the first granularity of metrics to be collected includes deeper level of metrics than the second granularity of metrics to be collected.

14. The non-transitory computer-readable storage medium of claim 9, wherein the steps further comprise grouping the SDDC components based on network traffic pattern to provide contextual health view of the SDDC components.

15. The non-transitory computer-readable storage medium of claim 9, wherein the SDDC components include virtual machines, containers or container clusters.

16. The non-transitory computer-readable storage medium of claim 9, wherein the metrics include CPU capacity usage, disk throughput usage and memory capacity usage.

17. A system comprising:
memory; and
at least one processor configured to:
    monitor network traffic in a computing environment to produce network traffic data;
    correlate the network traffic data for the computing environment with an inventory of SDDC components in the computing environment to calculate a metric collection parameter for each SDDC component in the computing environment based on data flow associated with that SDDC component, wherein an amount of metrics collected for each SDDC component is dependent on a corresponding metric collection parameter for that SDDC component;
    collect relevant metrics from each of the SDDC components in the computing environment according to the metric collection parameter for that SDDC component; and
    analyze the SDDC components in the computing environment using the relevant metrics for the SDDC components.

18. The system of claim 17, wherein the at least one processor is configured calculate a frequency of metric collection for each SDDC component in the computing environment based on the data flow associated with that SDDC component.

19. The system of claim 18, wherein the at least one processor is configured to calculate a first frequency of metric collection for a first SDDC component in the computing environment when the data flow associated with the first SDDC component exceeds a threshold and calculate a second frequency of metric collection for a second SDDC component in the computing environment when the data flow associated with the second SDDC component does not exceed the threshold, wherein the first frequency is higher frequency than the second frequency.

20. The computer-implemented method of claim 1, wherein the at least one processor is configured to calculate a granularity of metrics to be collected for each SDDC component in the computing environment based on the data flow associated with that SDDC component.

* * * * *